US008520707B2

(12) United States Patent
Ogata et al.

(10) Patent No.: US 8,520,707 B2
(45) Date of Patent: Aug. 27, 2013

(54) OPTICAL PICKUP DEVICE

(75) Inventors: Masahito Ogata, Suginami-ku (JP); Yoshio Noishiki, Saitama (JP)

(73) Assignees: SANYO Electric Co., Ltd., Moriguchi-shi (JP); SANYO Optec Design Co., Ltd., Tokyo (JP)

( * ) Notice: Subject to any disclaimer, the term of this patent is extended or adjusted under 35 U.S.C. 154(b) by 248 days.

(21) Appl. No.: 13/073,542

(22) Filed: Mar. 28, 2011

(65) Prior Publication Data
US 2011/0235497 A1  Sep. 29, 2011

(30) Foreign Application Priority Data

Mar. 29, 2010 (JP) .................................. 2010-074914
Mar. 10, 2011 (JP) .................................. 2011-052845

(51) Int. Cl.
*H01S 3/10* (2006.01)

(52) U.S. Cl.
USPC ...... 372/23; 372/29.02; 372/43.01; 372/50.1; 372/50.12

(58) Field of Classification Search
USPC .............................. 372/23, 29.02, 43.01, 50.1
See application file for complete search history.

(56) References Cited

FOREIGN PATENT DOCUMENTS

| JP | 2002-163837 | 6/2002 |
| JP | 2011-49293 | * 3/2011 |

* cited by examiner

*Primary Examiner* — Dung Nguyen
(74) *Attorney, Agent, or Firm* — Morrison & Foerster LLP

(57) ABSTRACT

The aberration takes place according to the height of the image because the laser light tilts from the optical axis when it enters to the object lens in the optical pickup device which is equipped with a laser diode for BD and the monolithic laser diode capable of irradiating laser lights with two different wavelengths for DVD and CD as one package to read the signal by single object lens and single optical system. This is because the light sources of the three lights with different wavelengths are away from each other in the optical pickup device. The emission point of the laser diode for BD is formed at the location shifted from the center of the chip. The laser diode for BD is disposed adjacent to the monolithic laser diode capable of irradiating laser lights with two wavelengths for DVD and CD to make the emission point closer to the monolithic laser diode. The sizes of these two laser diodes is minimized by employing half dicing during the cleavage processing for separating the chips. Therefore, the distance among the emission points can be reduced even with the configuration where two laser diodes are disposed on the substrate in lateral.

7 Claims, 8 Drawing Sheets

FIG.5D1 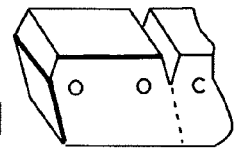

Prior Art

OPTICAL PICKUP DEVICE

This application claims priority from Japanese Patent Application Number JP 2010-074914, filed on Mar. 29, 2010, and JP2011-052845, filed on Mar. 10, 2011, the contents of which are incorporated herein by reference in their entirety.

BACKGROUND OF THE INVENTION

1. Field of the Invention

This invention relates to a semiconductor laser device and an optical pickup device using the semiconductor laser device, especially to a semiconductor laser device and an optical pickup device using the semiconductor laser device that uses a fewer number of the parts resulting in a lower cost.

2. Description of the Related Art

An optical disc device, which can perform reading action and recording action of signals by emitting laser light from an optical pickup device to a signal recording layer of an optical recording media (optical disc), has been widely known.

Efforts have been made to make a smaller and lighter optical pickup device that can accommodate multiple kinds of optical discs (such as CD (compact disc) or DVD (digital versatile disc)) smaller and lighter. For example, an object lens which is shared among laser lights with different wavelength is used. A laser device that has a plurality of semiconductor laser diodes (LD, hereinafter) with different wavelengths as one package is also known for using in the optical pickup device.

The optical system of the optical pickup device can be simplified and the number of parts used in the device can be lowered, leading to the lower cost, by putting a plurality of LDs with different wavelengths in one laser device as one package and by using one optical system with one lens for plurality of laser lights with different wavelengths (see the first patent document).

A device using an optical disc with improved recording density, such as blue-ray disc or HD-DVD (high density digital versatile disc), has recently been developed. An optical disc device and an optical pickup device that can be shared by these discs with the improved density has been highly demanded.

The light source for this kind of optical pickup device requires a LD that can emit laser lights with three different wavelengths, for example, one for Blue-ray Disc (BD), one for DVD, and one for CD. Therefore, a three-wavelength LD, which has these LDs in one package, has been developed. This technology is described for instance in Japanese Patent Application Publication No. 2002-163837.

FIG. 9 shows how one object lens converges laser lights from a three-wavelength LD 510. FIG. 9 is a simplified diagram showing the relationship in paraxial between laser lights emitted from each of the LDs and one optical system with one object lens for converging the lights in a three-wavelength LD 510 with three LDs (LD 501 for BD, LD 502 for DVD, and LD 503 for CD).

The LDs 501, 502, and 503 are disposed side by side on a package supporting substrate 511 and three laser lights are converged by one object lens 505. The light coming from each of the LDs goes to the center of a collimator 504. The light becomes a parallel light at the collimator 504 and goes into the lens 505. When the starting locations (the distance among the light emission points E1', E2', and E3) of the laser lights with three-wavelengths from each of the LDs are away from each other, laser lights are shifted away from the optical axis of the collimator 504, leading to the incline θ1 and θ2 in the lights coming from the collimator 504. Then, aberration takes place when the light comes into the object lens 505 depending on the amount of incline (height of the image).

For example, when the distance L1' between each of the lights E1', E2', and E3' and the collimator 504 is 15 mm, and the distance L2' between the light E1' and E2' is 0.3 mm, the incline θ1 of the light (shown as a solid line in the figure) coming from the collimator 504 of the LD 501 used for BD will be 1.2 degrees, leading to aberration of 0.090λ depending on the design of the object lens. It will be a factor for the deteriorated function of the optical pickup device.

Therefore, it is necessary to dispose three light emission points E1', E2', and E3' close to each other in the three-wavelength LD. However, it is difficult to put LDs with three different wavelengths closer when they are disposed side by side on the supporting substrate 511. Since the mounting error is about ±20 µm in general and the width W of the each LD is between 200 µm and 300 µm, it is very difficult to reduce the distance (L2) among the light emission points E1', E2,' and E3'.

FIG. 10 is another figure showing the three-wavelength LD 520. It is a side view of the three-wavelength LD 520 viewing from y axis, from which laser light comes from.

The LD for DVD and the LD for CD can be integrated on the same semiconductor substrate. Therefore, it is possible to form the three-wavelength LD 520 in which the LD 501 for BD is mounted on a monolithic chip with the LD 506 for both DVD and CD, as shown in FIG. 10.

The emission point E2' of the LD for DVD and the emission point E3' of the LD for CD can be formed through photo lithography in the LD 506 for both DVD and CD. Thus, the mounting error can be reduced in this configuration compared to the case that they are mounted independently (FIG. 9).

The emission point E1' of the LD 501 for BD can be aligned with one of the emission points (for example, E2') of the LD 506 for DVD and CD when the LD 501 for BD is mounted on the LD 506 for DVD and CD. In this configuration, only the distance L3' between two emission points E2' and E3' in the LD 506 for DVD and CD need to be considered.

However, exothermic property is not ideal in the layered configuration described above, especially that of the LD on the top layer (for example, the LD 501 for BD), deteriorating the reliability of the device. High exothermic property is required for the LD 501 for BD, as it generates large amount of heat.

Also, the semiconductor substrate (GaAs substrate) using LD 506 for DVD and CD does not provide a good exothermic property when the LD 506 for DVD and CD is disposed at the lower layer, which is another factor to deteriorate the reliability of the LD 501 for BD at the upper layer.

It is possible to dispose the LD 501 for BD as a lower layer for the better exothermic property. However, the chip size of the LD 501 needs to be increased. The semiconductor substrate (for example, GaN) for the LD 501 for BD has high cost. Therefore, the increased chip size will lead to a hiked manufacturing cost.

SUMMARY OF THE INVENTION

This invention aims to solve the problem described above.

The device of this invention has a first semiconductor laser element with a first emission point shifted from the center and a first side surface located close to the first emission point.

It also has a monolithic type two-wavelength semiconductor laser element with a second emission point and a third emission point formed on the second side surface facing against and adjacent to the first side surface.

The first semiconductor laser element and the second semiconductor laser element are disposed on the supporting substrate creating junction down configuration.

The second side surface of the second semiconductor laser element inclines in such manner that the distance from the first side surface increases as the second side surface moves away from the supporting substrate.

This invention aims at solving the problem by making the laser light coming from the second emission point superimposes with the actual optical axis.

The device of this invention has a first semiconductor laser element with a first emission point shifted from the center and a first side surface located close to the first emission point.

It also has a monolithic type two-wavelength semiconductor laser element with a second emission point and a third emission point formed on the second side surface facing against and adjacent to the first side surface.

The first semiconductor laser element and the second semiconductor laser element are disposed on the supporting substrate creating junction down configuration.

The second side surface of the second semiconductor laser element inclines in such manner that the distance from the first side surface increases as the second side surface moves away the supporting substrate.

The corner area of the second side surface located adjacent to the supporting substrate is cut-off from the resonator edge surface of the second semiconductor laser element through the other edge surface facing against the resonator edge surface.

This invention aims at solving the problem by making the laser light coming from the second emission point superimposes with the actual optical axis.

BRIEF DESCRIPTION OF THE DRAWINGS

FIGS. 5A, 5B, 5C, 5D, 5D1, 5E, and 5F are respectively perspective and side views to explain the embodiment of the semiconductor laser element.

DESCRIPTION OF THE INVENTION

Embodiments of this invention will be explained in details by using FIGS. 1-8. First, the first embodiment of this invention will be explained using FIGS. 1A-6C.

Figure 1A:
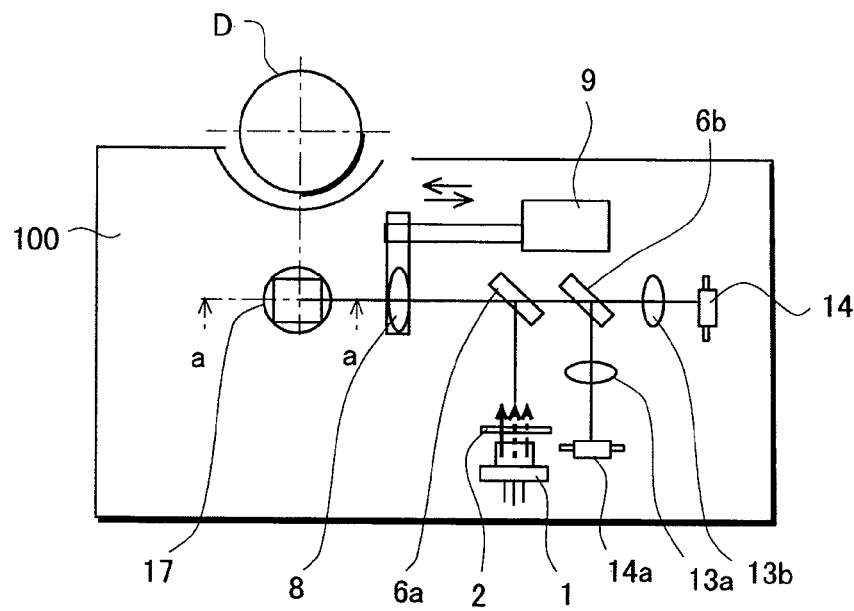
FIGS. 1A and 1B are simplified diagrams showing an embodiment of the semiconductor laser device of this invention.
Figure 1B:
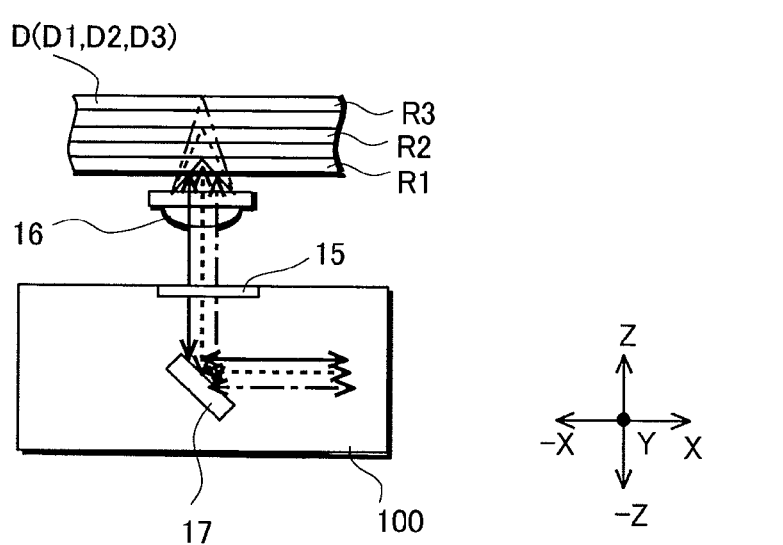

FIGS. 1A and 1B are simplified diagrams showing an optical system of an optical pickup device 100 of this embodiment. FIG. 1A shows the entire optical pickup device 100.

FIG. 1B is a simplified cross-sectional view of the FIG. 1A along with the a-a line in FIG. 1A showing the relationship between an optical recording media (optical disc) and the optical system. The optical disc D is referred to a first optical disc D1, a second optical disc D2, and a third optical disc D3 hereinafter. In an actual device, one of the first optical disc D1, the second optical disc D2, and the third optical disc D3 which as for the object of the reading operation and the recording operation of the signal is disposed. Here, the explanation will be made by using the optical disc, as an example of the optical recording media.

The optical pickup device 100 is used for the information recording reproducing device such as an optical disc reproducing device. A laser light collected at one object lens 16 irradiates at the optical disc D. Then, the returning laser light which is being reflected from the information recording surface of the optical disc D is detected for reading the information from the optical disc D or writing the information into the optical disc D. The optical disc D in this embodiment can be, for example, the first optical disc D1 for BD (Blue-ray Disc), the second optical disc D2 for DVD, or the third optical disc D3 for CD. The distance between the surface of the first optical disc D1 and a signal recording layer R1 is short, while the distance between the surface of the third optical disc D3 and the signal recording layer R3 is long. The distance between the surface of the second optical disc D2 and the signal recording layer R2 is longer than that of the first optical disc D1, but shorter than that of the third optical disc D3. The optical pickup device 100 can accommodate each of the optical discs D.

The optical pickup device 100 has a semiconductor laser device 1, a diffraction grating 2, a semitransparent mirror 6a, dichroic mirror 6b, a collimator lens 8, a reflecting mirror 17, a quarter wavelength plate 15, an object lens 16, a first anamorphic lens 13a, a second anamorphic lens 13b, a first light detection device 14a and a second light detection device 14b.

The detailed description of the semiconductor laser device 1 will be made in the following section. Two chips including a first semiconductor laser element and a second semiconductor laser element are mounted within one package. The semiconductor laser device 1 emits laser lights with three wavelengths. The first and second semiconductor laser elements are laser diode (LD). The first laser diode, (the first LD hereinafter) is a LD for BD that emits the first laser light with the first laser wavelength (for example, 405 nm: shown as a solid line in the figure) used for reading and writing of the first optical disc D1 that is either for BD or HD-DVD. The second laser diode (the second LD hereinafter) is a LD for DVD/CD that emits the second laser light with the second wavelength (for example, 650 nm; shown as a dotted line in the figure) used for the optical disc for DVD and the third laser light with the third wavelength (for example 780 nm; shown as a dashed line in the figure) used for the disc for CD.

The diffraction grating 2 separates the first, second, and third laser lights emitted from the semiconductor laser device 1 into 0-order diffracted light, +1-order diffracted light, and −1-order diffracted light.

The semitransparent mirror 6a reflects the laser light emitted from the laser semiconductor device 1 and coming through the diffraction grating 2 into −X direction, while it transmits the laser light reflected by the optical disc D (returning light) into +X direction, because the returning light reflected by the optical disc D has a different polarizing direction from that of the light when it is emitted from the laser semiconductor device 1.

The collimator lens 8 makes the laser light reflected by the semitransparent mirror 6a a parallel light. The collimator lens 8 is movable by a motor 9 in ±X directions. This configuration allows the correction of the deterioration based on temperature variation of the optical property of the object lens 16. Furthermore, the spherical aberration, which is caused by the difference in the thickness of the cover layer covering the information recording layer of the optical disc D or the difference in the thickness of the cover layer of the each information recording layer in the optical recording media with a multilayer configuration, can also be corrected.

The reflecting mirror 17 has an ability to reflect the laser light travelling in −X direction coming through the collimator lens 8 into a +Z direction.

The quarter wavelength plate 15 is formed above the reflecting mirror 17 in Z direction. It can convert the laser light reflected at the reflecting mirror 17 from a linearly polarized light to a circularly polarized light, and convert the returning light reflected by the optical disc D from a circularly polarized light to a linearly polarized light.

The object lens 16 is formed above the reflecting mirror 17 in Z direction. It has a property to make the laser light, which has been oriented vertically at the reflecting mirror 17 into Z direction, focus on the information recording surface of the optical disc D. The object lens 16 is shared among the first laser light (solid line), the second laser light (dotted line), and the third laser light (dashed line) that is used for BD, DVD, and CD respectively.

It is also possible for the object lens 16 not to be shared. That is, the first laser diode for BD and the second laser diode for DVD/CD can have separate object lenses.

The dichroic mirror 6b reflects the laser light with a specific wavelength and transmits the laser lights with other wavelengths. The dichroic mirror 6b in this embodiment transmits the second laser light and third laser light for DVD and CD, and reflects the first laser light for BD.

The first anamorphic lens 13a provides astigmatism to the laser light irradiating to the first light detection device (photo diode IC, referred to as PDIC hereinafter) 14a after reflected at the dichroric mirror 6b.

The second anamorphic lens 13b provides astigmatism to the laser light irradiating to the second PDIC 14b after transmitted through the dichroic mirror 6b.

The first PDIC 14a is formed at the location where the returning light of the first laser light is collected and irradiated and it is configured from a four part sensor made of photo diodes.

The second PDIC 14b is formed at the location where the returning light of the second and third laser lights are collected and it is configured from a four part sensor made of photo diodes.

The first PDIC 14a and the second PDIC 14b receive and detect each laser light and they perform focus servo as well as tracking servo.

Servo, that is performed using the first PDIC 14a and the second PDIC 14b, includes focus servo for focusing in vertical direction of the recording surface of the optical disc and tracking servo for positioning in radius direction that follows the recording track of the optical disc. The astigmatism method or the differential astigmatism method can be used for focus servo. The push pull method, the differential push pull method, inline DPP (differential push pull), DPP method, or the three beam method can be used for tracking servo.

Next, the read out operation and the write in operation of the optical pickup device 100 will be explained. The semiconductor laser device 1 emits lights with three different wavelengths (the first laser light, the second laser light, and the third laser light). These laser lights have the same path ways (optical path) until they hit the optical disc D. Also, the read out operation and the write in operation are the same as described below.

Each laser light emitted from the semiconductor laser device 1 is separated into 0-order diffracted light, +1-order diffracted light, and −1-order diffracted light by the diffraction grating 2 for focus servo and tracking servo to be performed at the first PDIC 14a and the second PDIC 14b.

The laser light coming through the diffraction grating 2 is now reflected in −X direction at the semitransparent mirror 6a. Then, it is converted in to the parallel light at the collimator lens 8. Finally, it travels in vertical direction (Z direction) to the optical disc D as it is reflected in Z direction by the reflecting mirror 17.

The laser light is converted to a circularly polarized light at the quarter wavelength plate 15. Then, the laser light enters the object lens 16 and is focused at the optical disc D by the focusing operation of the object lens 16 supported by an actuator (not shown in the figure).

The first laser light is emitted to a light collection point on the signal recording layer R1 on the first optical disc D1, and the first laser light irradiating is reflected by the signal recording layer R1 as the returning light.

The second laser light is emitted to a light collection point on the signal recording layer R2 on the second optical disc D2, and then the second laser light irradiating is reflected by the signal recording layer R2 as the returning light.

The third laser light is emitted to a light collection point on the signal recording layer R3 on the third optical disc D3, and then, the third laser light irradiating is reflected by the signal recording layer R3 as the returning light.

The second LD 12 is disposed in such manner that the optical axis of the second laser light or the third laser light coincides with the optical axis of the object lens 16 in this embodiment. The detailed will be explained in the following section.

The returning lights reflected at the signal recording layers R1, R2, and R3 of the optical disc D, irradiate the semitransparent mirror 6a after traveling through the object lens 16, the quarter wavelength plate 15, the reflecting mirror 17, and collimator lens 8.

The returning laser light is converted from a circularly polarized light into a linearly polarized light when it is transmitted through the quarter wavelength plate 15. Therefore, the polarization angle of the returning light rotates 90 degree, then the laser light become a controlling laser light after passing through the semitransparent mirror 6a that has polarization dependency. A semitransparent mirror without polarization dependency can be also used. In this case, the returning laser light entering the semitransparent mirror 6a is reflected about 50%, which becomes about 50% of the controlling laser light when it passes through the semitransparent mirror 6a.

The controlling laser light of the first laser light transmitted through the semitransparent mirror 6a and reflected at the dichroic mirror 6b irradiates at the first anamorphic lens 13a. The astigmatism for focus servo is provided to the controlling laser light, which, then, reaches to the first PDIC 14a.

The controlling laser light of the second or the third laser lights transmitted through the semitransparent mirror 6a and the dichroic mirror 6b irradiates at the second anamorphic lens 13b. The astigmatism for focus servo is provided to the controlling laser light, which, then, reaches to the second PDIC 14b.

A well-known four part sensor is formed in the first PDIC 14a and the second PDIC 14b. They perform a signal generating operation which take place along with the reading operation of the signal recorded in the optical disc D by using a main beam irradiation and a focus error signal generating operation for performing focusing controlling operation through the astigmatism method. They also perform a signal generating operation of the tracking error correction signal for the tracking controlling operation with two sub-beam irradiation operation. The controlling operation to generate each of the signals has been well known. Therefore, the explanation of this operation is omitted here.

The optical pickup device 100 of this embodiment of this invention has an optical system where the laser lights with three different wavelengths irradiated from the semiconductor laser device 1 are directed to the optical disc D and where the three laser lights reflected at the optical disc D are directed to the first PDIC 14a and the second PDIC 14b.

Figure 2A:
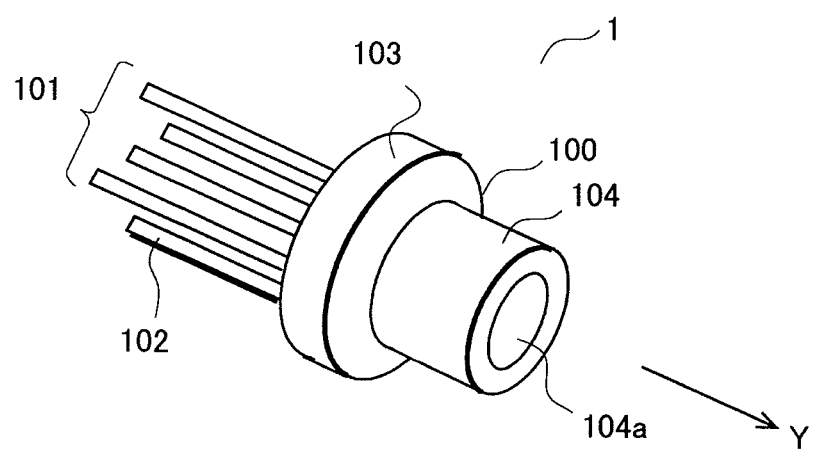
FIGS. 2A and 2B are perspective views of the embodiment of the semiconductor laser device of this invention.
Figure 2B:
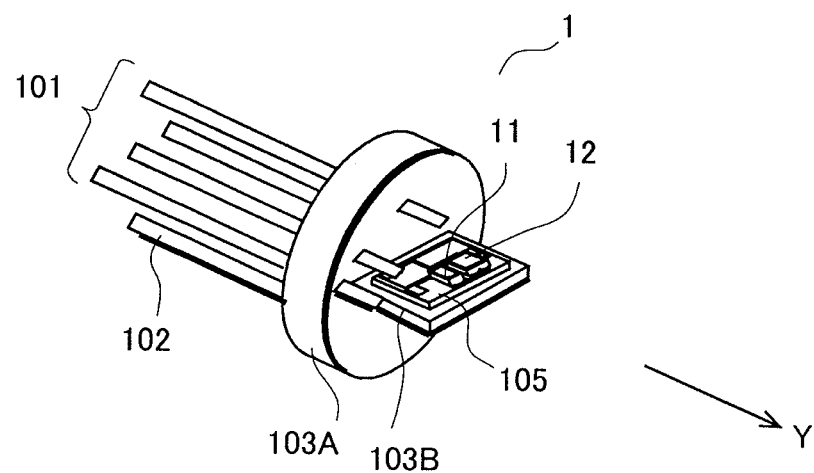

The semiconductor laser device 1 of this invention will be explained by using FIGS. 2A and 2B. FIG. 2A is a perspective view showing the outer look of the semiconductor laser device 1 of this invention. FIG. 2B is a perspective view showing the inside of the semiconductor laser device 1.

The semiconductor laser device 1 has a first semiconductor laser element (a first LD) 11, a second semiconductor laser element (a second LD) 12, and a package 100 which stores the laser elements 11 and 12.

The package 100 is a circular type CAN that is made of conducting material. It has a stem 103, which is configured with a disc-shaped base portion 103A and a plate portion 103B protruding from the base portion, terminals 101, 102, and a cap portion 104. The stem 103 is made of conduction material and a supporting substrate 105 is formed on the plate portion 103B. The supporting substrate 105 can be made of conductor material, for example, a silicon substrate doped densely with AlN (nitride aluminum) or impurities or a silicon substrate made of semi-insulating or insulating material. A ceramic substrate can also be used.

The first LD 11 and the second LD 12 are adhered to the supporting substrate 105 with conductor adhesive such as solder or conductor paste. The first LD 11 and the second LD 12 are mounted side by side and sealed in with the cap portion 104. A window 104a for taking in the laser light made from a material which transmits the laser light is formed on the cap portion 104. The terminal 101 is mechanically connected to the stem 103 and the terminal 102 is mechanically and electronically connected to the stem 103. The terminal 102 is used as the ground terminal. The other edges of the terminals 101 and the 102 are connected to the driving circuit not shown in the figure.

The first LD 11 and the second LD 12 are mounted on the supporting substrate 105 in such manner that the direction of the laser light irradiation is toward the outer side (the side where the window 104a is formed; Y direction) of the semiconductor laser device 1, and the second laser light and the third laser light coming from the second LD 12 goes through the center of the window 104a.

Figure 3:
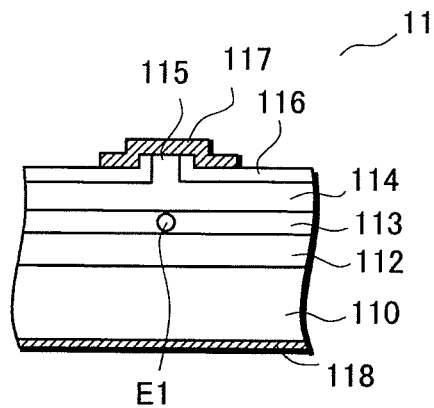
FIG. 3 is a side view of the embodiment of the semiconductor laser element of this invention.

The configuration of the first LD 11 is explained by referring to FIG. 3. FIG. 3 is a simplified diagram explaining each semiconductor layer of the first LD 11, showing the side view of the first LD 11 looking from Y direction.

The first LD 11 is a blue-violet semiconductor laser element made from semiconductor layers of nitride compound. That is, the first LD 11 has a n-type clad layer 112 made of n-type AlGaN, an active layer 113 which has a multi quantum well (MQW) configuration where a quantum well layer made of InGaN with high In composition and a buffer layer made of InGaN with low In composition are alternately layered, and a p-type clad layer 114 made of p-type AlGaN on the main surface of a n-type GaN substrate 110.

Other semiconductor layer such as a light guide layer (not shown in the figure) and a carrier block layer (not shown in the figure) can be formed between the n-type clad layer 112 and the active layer 113. Also, other semiconductor layer such as a contact layer (not shown in the figure) can be disposed at the opposite side of the n-type clad layer 112 and the active layer 113. Other semiconductor layer such as a light guide layer (not shown in the figure) and a carrier block layer (not shown in the figure) can also be formed between the active layer 113 and the p-type clad layer 114. Other semiconductor layer such as a contact layer (not shown I the figure) can be disposed at the opposite side of the active layer 113 and the p-type clad layer 114. The active layer 113 can be either a single layer or a layer with the single quantum well (SQW) configuration.

The p-type clad layer 114 has a 凸 (convex) portion and a plane portion extending to the both side of the 凸 portion. The 凸 portion of the p-type clad layer 114 is a ridge portion 115 for forming an optical waveguide at the active layer 113. Therefore, the first emission point E1 from which the laser light with the first wavelength irradiates is formed at the edge of the active layer 113 beneath the ridge portion 115.

An electric current blocking layer 116 made from an insulating film is formed to cover the plane surface of the p-type clad layer 114 and the side surface of the ridge portion 115. A p-side electrode 117 made of Au is disposed covering the p-type clad layer 114 and the electric current blocking layer 116. It can be formed a contact layer which a band gap is small more preferably than the p-type clad layer 114 (not shown in the figure) or an ohmic electrode layer (not shown in the figure) between the ridge portion 115 and the p-side electrode 117.

A n-side electrode 118 made from Ti layer, Pt layer, and Au layer with the Ti layer located the closest to the n-type GaN substrate 110 is disposed at the back surface of the GaN substrate 110.

Figure 4:
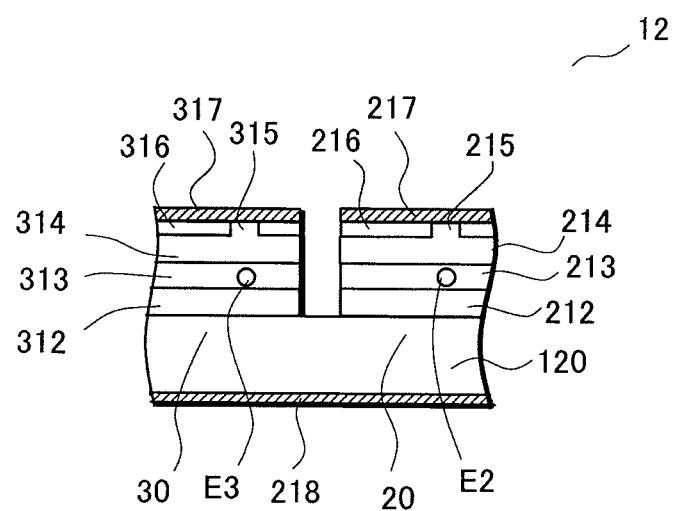
FIG. 4 is a side view of the embodiment of the semiconductor laser element of this invention.

The configuration of the second LD 12 is explained by referring to FIG. 4. FIG. 4 is a simplified diagram explaining each semiconductor layer of the second LD 12, showing the side view of the second LD 12 looking from Y direction.

The second LD 12 is a monolithic two-wavelength semiconductor laser element with a red semiconductor laser element 20 and infrared semiconductor laser element 30 integrated on a n-type GaAs substrate 120. Here, two laser elements are formed, but a monolithic multi-wavelength semiconductor laser element with a plurality of laser elements can be also used.

The red semiconductor laser element 20 is made from a compound semiconductor layer including P (phosphorus). That is, the red semiconductor laser element 20 has a n-type clad layer 212 made of n-type AlGaInP, an active layer 213 where a quantum well layer made of GaInP and a buffer layer made of AlGaInP are alternately layered, and a p-type clad layer 214 made of p-type AlGaInP on the main surface of a n-type GaAs substrate 120.

Other semiconductor layer such as a light guide layer (not shown in the figure) and a carrier block layer (not shown in the figure) can be formed between the n-type clad layer 212 and the active layer 213. Also, other semiconductor layer can be disposed at the opposite side of the n-type clad layer 212 and the active layer 213. Other semiconductor layer such as a light guide layer (not shown in the figure) and a carrier block layer (not shown in the figure) can be formed between the active layer 213 and the p-type clad layer 214. Also, other semiconductor layer such as a contact layer (not shown in the figure) can be disposed at the opposite side of the active layer 213 and the p-type clad layer 214. The active layer 213 can be either a single layer or a layer with the SQW configuration.

The p-type clad layer 214 has a ⊥ portion and a plane portion extending to the both side of the ⊥ portion. The ⊥ portion of the p-type clad layer 214 is a ridge portion 215 for forming an optical waveguide at the active layer 213. Therefore, the second emission point E2 from which the laser light with the second wavelength irradiates is formed at the edge of the active layer 213 beneath the ridge portion 215.

An electric current blocking layer 216 made from an insulating film is formed to cover the plane surface of the p-type clad layer 214 and the side surface of the ridge portion 215. A p-side electrode 217 made of Au is disposed covering the p-type clad layer 214 and the electric current blocking layer 216. It can be formed a contact layer which a band gap is small more preferably than the p-type clad layer 214 (not shown in the figure) or an ohmic electrode layer (not shown in the figure) between the ridge portion 215 and the p-side electrode 217. A n-side electrode 218 made from Ti layer, Pt layer, and Au layer with the Ti layer located the closest to the n-type GaAs substrate 120 is disposed at the back surface of the GaAs substrate 120.

The infrared semiconductor laser element 30 is made from a compound semiconductor layer including As (arsenic). That is, the infrared semiconductor laser element 30 has a n-type clad layer 312 made of n-type AlGaAs, an active layer 313 where a quantum well layer made of AlGaAs with low Al composition and a buffer layer made of AlGaAs with high Al composition are alternately layered, and a p-type clad layer 314 made of p-type AlGaAs on the main surface of a n-type GaAs substrate 120.

Other semiconductor layer such as a light guide layer (not shown in the figure) and a carrier block layer (not shown in the figure) can be formed between the n-type clad layer 312 and the active layer 313. Also, other semiconductor layer can be disposed at the opposite side of the n-type clad layer 312 and the active layer 313. Other semiconductor layer such as a light guide layer (not shown in the figure) and a carrier block layer (not shown in the figure) can be also formed between the active layer 313 and the p-type clad layer 314. Also, other semiconductor layer such as a contact layer (not shown in the figure) can be disposed at the opposite side of the active layer 313 and the p-type clad layer 314. The active layer 313 can be either a single layer or a layer with the SQW configuration.

The p-type clad layer 314 has a ⊥ portion and a plane portion extending to the both side of the ⊥ portion. The ⊥ portion of the p-type clad layer 314 is a ridge portion 315 for forming an optical waveguide at the active layer 313. Therefore, the second emission point E3 from which the laser light with the third wavelength irradiates is formed at the edge of the active layer 313 beneath the ridge portion 315.

An electric current blocking layer 316 made from an insulating film is formed to cover the plane surface of the p-type clad layer 314 and the side surface of the ridge portion 315. A p-side electrode 317 made of Au is disposed covering the p-type clad layer 314 and the electric current blocking layer 316. It can be formed a contact layer which a band gap is small more preferably than the p-type clad layer 314 (not shown in the figure) or an ohmic electrode layer (not shown in the figure) between the ridge portion 315 and the p-side electrode 317. A n-side electrode 218 is disposed at the back surface of the GaAs substrate 120.

Figure 5A:
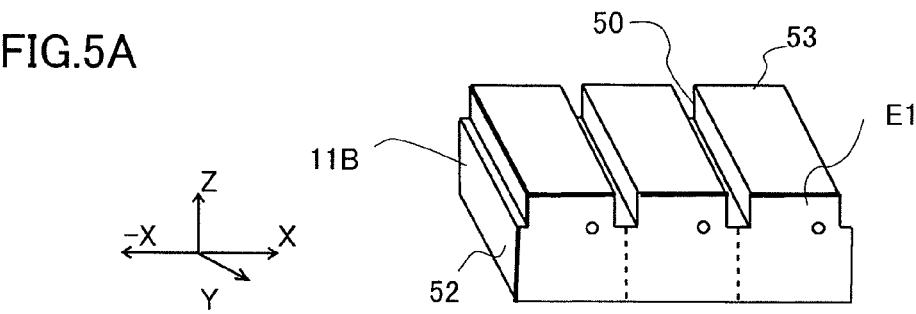
Figure 5B:
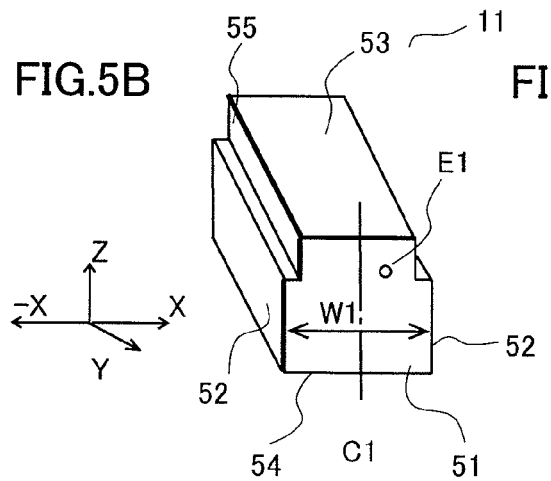
Figure 5C:
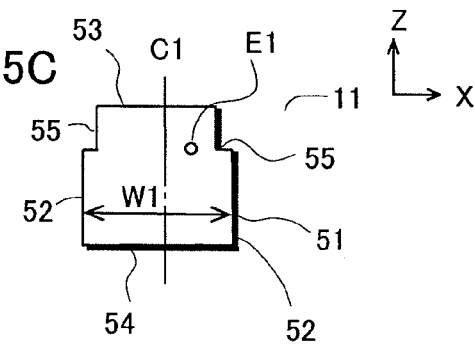
Figure 5D:
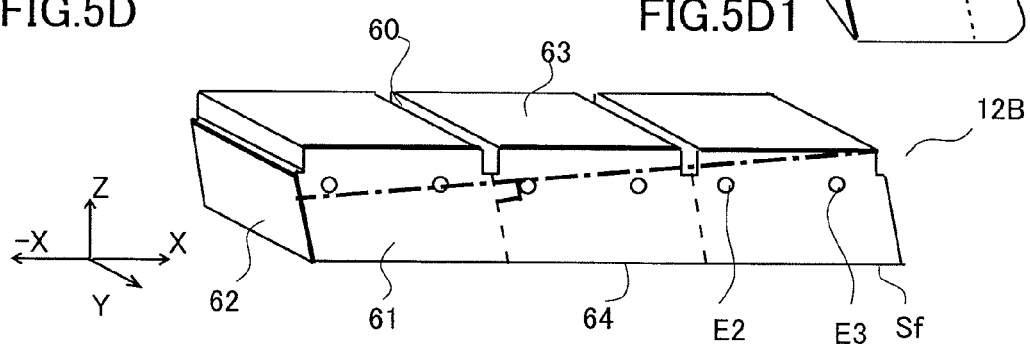
Figure 5E:
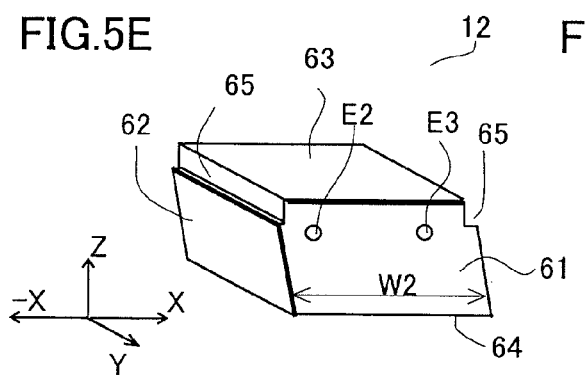
Figure 5F:
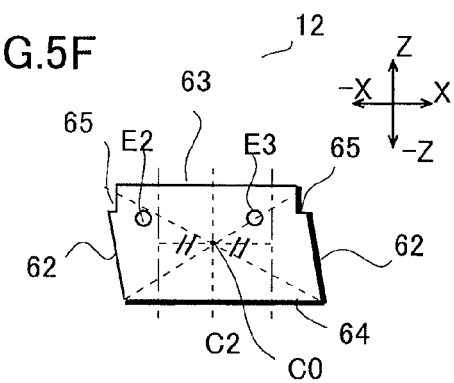

FIGS. 5A to 5F show the first LD 11 and the second LD 12 that have the configurations explained above by using FIGS. 3 and 4 on the wafer, which is to be separated into individual chips. Each figure shows the outer look of the chip omitting the detailed diagram of the semiconductor layers. FIGS. 5A to 5C shows the first LD 11 and FIGS. 5D and 5F shows the second LD 12.

The first LD 11 and the second LD 12 are separated into individual chips through a cleavage processing. The cleavage processing has two steps; the first cleavage processing, where the chips disposed on a wafer in matrix are cut into groups of chips like bars, with a plurality of chips aligned in rows on each bar (or a plurality of chips aligned in column in each column), and the second cleavage processing, where the group of chips like a bar is separated into individual chips.

FIG. 5A is a side perspective view showing the group of chips like a bar 11B for the first LD 11 after the first cleavage processing. FIG. 5B is a side perspective view showing an individual chip for the first LD 11 and FIG. 5C is a side view showing the X-Z surface of the first LD 11.

Cleavage ditches 50 with a certain depth from the main surface of the wafer (the group of chips 11B) are formed in the group of chips like a bar through half dicing using laser. Then, it is separated into an individual first LD 11 by putting weight or impact onto the cleavage ditch 50 (FIG. 5B). The Z-Y side in FIG. 5B corresponds to the dotted line shown in FIG. 5A and it can be fully cut with the width thinner than the width of the ditch 50. Although the actual ditch has a U-shape resulted from the laser half dicing, FIG. 5C shows steps like a L-shape.

The cleavage surface (X-Z surface) resulted from the first cleavage processing is the resonator surface 51 in the first LD 11. The Y-Z surface, which becomes the second cleavage surface, extending into the resonating direction (Y direction) of the laser light will be referred to as a side surface 52 in a chip of the first LD 11. The X-Y surface that locates closer to the first emission point E1 among the two main X-Y surfaces of the wafer (the surface where the p-side electrode 117 is formed (see FIG. 3)) is referred to as an upper surface 53 of the chip and its opposite surface (where the n-side electrode 118 (see FIG. 3)) is referred to as a lower surface 54 of the chip.

The chip of the first LD 11 is cut in such manner that the side surface 52 has a right angle to the upper surface 53 as well as to the lower surface 54. A cut-off portion 55, which is a part of the cleavage ditch 50 is formed at the edge of the upper surface 53 of the side surface 52. The width of the upper surface 53 is narrower than that of the lower surface 54 because of the cut-off portion 55.

The ridge portion 115 (see FIG. 3) is formed extending toward the resonating direction (Y direction). The ridge portion 115 of the first LD 11 is formed in such manner that the central potion (C1 line) of the element (chip) is shifted in one direction (for example, +X direction) in this embodiment.

The resonator surface 51 has the first emission point E1, from which the first laser light irradiates in Y direction. That is, the first emission point E1 of the first LD 11 is formed at the location shifted from the center (C1 line) of the chip of the first LD 11 to, for example, +X direction.

For example, the first emission point E1 is disposed at the location 30 μm from the side surface 52 and from 70 μm from the side surface 52.

FIG. 5D is a perspective view showing the group of chips like a bar 12B for the second LD 12 after the first cleavage processing. FIG. 5E is a perspective view showing an individual chip for the second LD 12 and FIG. 5F is a side view showing the X-Z surface of the second LD 12.

A ditch 60 with a certain depth from the main surface of the wafer (the group of chips 12B) is formed at the edge where individual chips are disposed like a bar. The ditch 60 is, for example, an etching ditch formed during the manufacturing process. It is also possible to form this ditch using laser before the cleavage processing as in the case of the first LD 11. Then, weight or impact is applied to the ditch to create an individual second LD 12. The shape of the ditch is either V shape or U shape. The V shape or the U shape ditch can be formed through etching or dicing using a blade. The U shape ditch is created when laser dicing is applied.

The cleavage surface (X-Z surface) resulted from the first cleavage processing is the resonator surface 61 in the second LD 12. The Y-Z surface, which becomes the second cleavage surface, extending into the resonating direction of the laser light will be referred to as a side surface 62 in a chip of the second LD 12. The X-Y surface that locates closer to the second emission point E2 and the third emission point E3 among the two main X-Y surfaces of the wafer (the surface where the p-side electrode 217, 317 is formed (see FIG. 4)) is referred to as an upper surface 63 of the chip and its opposite surface (where the n-side electrodes 218, 318 (see FIG. 3)) is referred to as a lower surface 64 of the chip.

The chip of the second LD 12 is cut in such manner that the side surface 62 has a steep side surface with a certain angle to the vertical surface to the upper surface 63 as well as to the lower surface 64 (Z-Y surface), because the crystal orientation of the n-type GaAs substrate 120 of the second LD 12 has an inclination of 10° against the horizontal surface (for example, the lower surface Sf of the wafer, see the dashed line in FIG. 5D). The semiconductor layers that are mounted on the n-type GaAs substrate 120 is also disposed with the same inclination and they are cleft along the crystal part with a lower mechanical strength shown as dotted line in the figure. That is, the side surface 62 of the separated second LD 12 is steep side surface, the resonator surface 61 becomes a substantially parallelogram. Substantially parallelogram is defined as the rectangular where a set of two corners diagonally facing each other has an obtuse angle and another set of two corners diagonally facing each other has an acute angle.

The cut-off portion 65, which is a part of the cleavage ditch 60, is also formed at the upper portion of the side surface 62 in the second LD 12. The width of the upper surface 63 is narrower than that of the lower surface 64 because of the cut-off portion 65.

The ridge portions 215 and 315 (see FIG. 4) are formed extending toward the resonator direction (Y direction). The ridge portions 215 and 315 are formed in such manner that the central portion (C2 line) of the element (chip) is shifted in one direction (for example, −X direction).

The resonator surface 61 has the second emission point E2 for the red semiconductor laser element 20 and the third emission point E3 for the infrared semiconductor laser element 30. That is, the second laser light with the second wavelength is emitted from the second emission point E2 in Y direction and the third laser light with the third wavelength is emitted from the third emission point E3 in Y direction.

The location of the second emission point E2 and the third emission point E3 is shifted from the standard position based on the center (C2 line) of the chip of the second LD 12, for example, toward the edge in the −X direction. Here, the center of the chip locates at C0 in the figure (C0 is the intersection of two diagonals of the parallelogram pretending there is no cut-off portion 65 in the cross sectional surface of the chip). When the distances between the center and the second emission point E2 and that between the center and the third emission point E3 are the same, they are not shifted, but they are at the standard position (shown as a dashed line in the figure). That is, when the second and third emission points E2 and E3 locate away from the standard position toward the edge, they are considered to be shifted.

The amount of the shifts for the emission point E2 and the emission point E3 do not have to be the same, but the direction of the shift should be the same. It is also possible to let either one of the emission point E2 or the emission point E3 shifts from the standard position. Furthermore, the second emission point E2 and the third emission point E3 of the second LD 12 can be formed at the standard position, if the first emission point E1 of the first LD 11 is shifted toward the edge of the second LD 12 side. Please confirm to FIG. 6A.

The chip size (chip width) can be reduced because of the improvement in the manufacturing process of the first LD 11 and the formation of the cleavage ditch 50 using laser in this embodiment.

The cleavage position and direction for the cleavage processing is determined by the crystal orientation when the GaAs substrate (the second LD 12) is used (FIG. 5D).

On the other hand, it is necessary to form the cleavage ditch 50 by half dicing using laser or the like to cleave the GaN substrate, because the GaN substrate 110 used for the first LD 11 in this embodiment is hard. However, since the cleavage ditch 50 can be formed in desired location, the desired width of the chip can be obtained. That is, the narrower width, which cannot be achieved with the cleavage processing for the GaAs substrate of prior arts, can be obtained for the first LD 11.

For example, the chip size (a chip width W1) of the first LD 11 can be reduced to about 100 μm, which is from ½ to ⅓ size of that of the prior arts. A chip width W2 of the second LD 12 is about from 200 μm to 300 μm.

Therefore, the cost of the first LD 11 can be reduced, because of the smaller chip size compared to that of the prior arts. The stress to the supporting substrate 105 and GaN substrate can be also reduced because of the small size.

Additionally, the first LD 11 has a better radiation of heat compared to that of the stacked structure of the first LD 11 and the second LD 12, because it can be mounted directly to the supporting substrate 105.

Moreover the cleavage ditch 50 of the first LD 11 can also have a V shape (see FIG. 5D1).

Figure 6A:
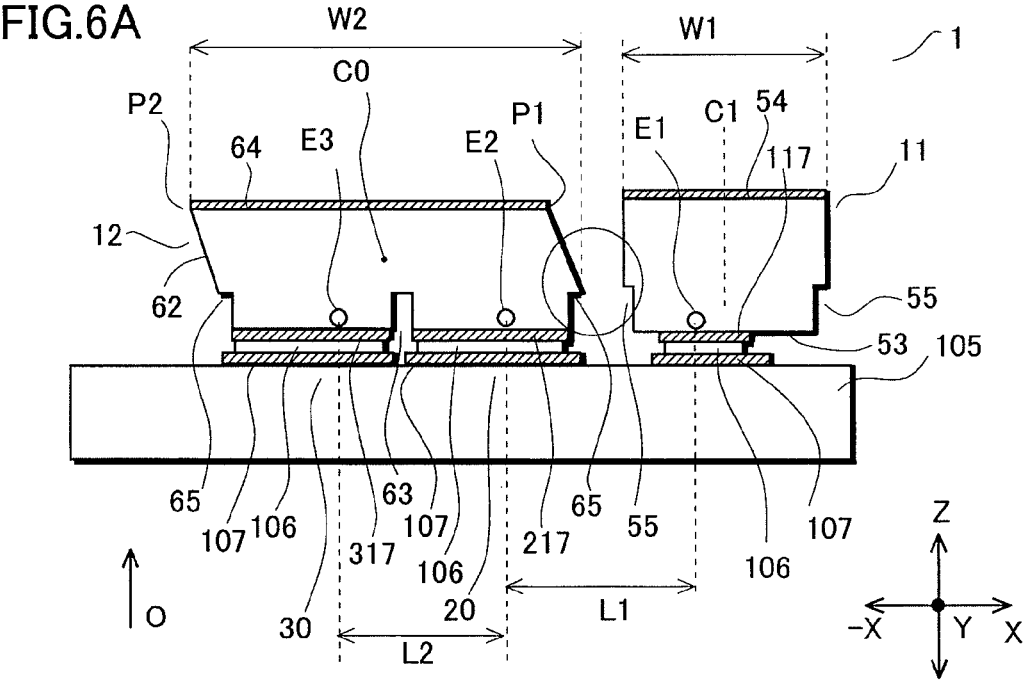
FIGS. 6A, 6B, and 6C are respectively side and plan views to show the embodiment of the semiconductor laser devise.
Figure 6B:
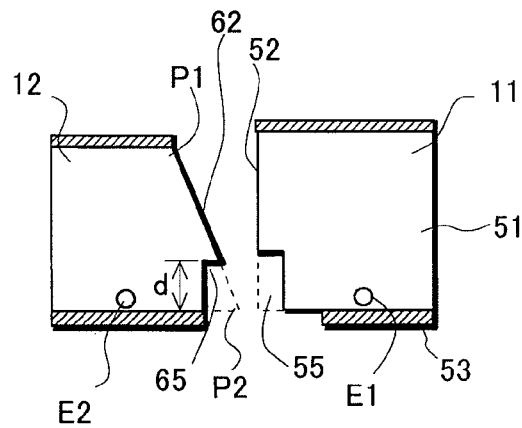
Figure 6C:
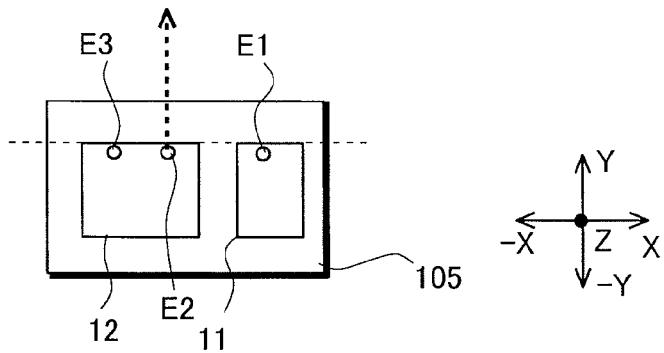

The mounted configuration of the first LD 11 and the second LD 12 is explained by referring to FIGS. 6A to 6C. FIG. 6A shows the first and second LDs 11 and 12 looking from the Y direction, direction from which the laser light irradiate. FIG. 6B is an enlarged diagram of the circled area in FIG. 6A and the FIG. 6C shows the first LD 11 and the second LD 12 looking from the Z direction.

The first LD 11 and the second LD 12 are disposed on the supporting substrate 105 adjacent to each other (in lateral) in X direction.

The first LD 11 and the second LD 12 are disposed to create junction down configuration. The first emission point E1, the second emission point E2, and the third emission point E3 locate close to the supporting substrate 105 in the junction down configuration. That is, the p-type clad layer 114 (see FIG. 3) of the first LD 11, the p-type clad layers 214 and 314 (see FIG. 4) of the second LD 12 are facing against the supporting substrate 105.

The first emission point E1, the second emission point E2, and the third emission point E3 locate close to the supporting substrate 105 in the junction down configuration. Therefore, it has a better radiation of heat compared to that of the junction up configuration where the n-type GaN substrate 110 and the n-type GaAs substrate 120 are facing to the supporting substrate 105.

A conductor pattern 107 on the supporting substrate 105 and its corresponding p-side electrode 117 of the first LD 11 and the p-side electrodes 217 and 317 of the second LD 12 are put together using a conduction adhesive such as solder or conduction paste.

The first LD 11 is disposed next to the second LD 12 on the supporting substrate 105 in such manner that the emission point E1, the location of which is shifted from the center toward the edge, locates closer to the second LD 12.

The second emission point E2 and the third emission point E3 are shifted from the standard position based on the center of the chip toward the edge of the chip in this embodiment. The second and third emission points E2 and E3 are shifted toward the direction (+X direction) in which they locate closer to the first LD 11 when the second LD 12 is mounted.

The first LD 11 and the second LD 12 are disposed in such manner that the first LD 11 and the second LD 12 locate the closest to each other as for the main surfaces of the chips closer to which the first emission point E1, the second emission n point E2, and the third emission point E3. That is, the first LD 11 and the second LD 12 are disposed most closest to each other as for the mounting surface on the support substrate 105 in such manner that the distance between the upper surface 53 of the first LD 11 and the upper surface 63 of the second LD 12 is smaller than the distance between the lower surface 54 of the first LD 11 and the lower surface 64 of the second LD 12. For example, the first LD 11 and the second LD 12 can be disposed in such manner that the corner of the first LD 11 shown as a dotted line and the corner of the second LD 12 shown as a dotted line in FIG. 6B can be superimposed or touched.

Although the first LD 11 and the second LD 12 are disposed adjacent to each other in lateral direction on the supporting substrate 105, distances among the first emission point E1, the second emission point E2 and the third emission point E3 are reduced, because the chip size of the first LD 11 is reduced than that of the prior arts and because the first emission point E1 is formed at the location shifted from the center.

The side surface 62 of the second LD 12 is inclined. Therefore, it has a corner portion P1 that has a smaller distance from the central point C0 and a corner portion P2 that has a larger distance from the central point C0 of the chip. The P2 corner portion is a portion that protrudes in the direction of the width compared with the case of a rectangular parallelepiped chip. It is necessary to dispose the first LD 11 with an enough space away from the corner portion P2 in order to avoid its influence.

For example, the case of the junction down configuration, if the first LD 11 is formed at the location where the arrow O shown in FIG. 6A, the corner portion P2 protrudes in the direction of the first LD 11. Therefore, there will be a limitation to reduce the distance between the first emission point E1 and the third emission point E3.

The corner portion is located near the upper portion of the side surface 52 of the first LD 11 in this embodiment as shown in FIG. 6B. This corner portion extends from one resonator surface facing front all the way to the other resonator surface, forming the cut-off portion 55. Furthermore, another corner portion exists near the upper portion of the side surface 62 of the second LD 12 that is facing against the side surface 52, forming the cut-off portion 65 from the one resonator surface facing front all the way to the other resonator surface.

Therefore, as for the side surfaces of the first LD 11 and the second LD 12 facing against each other (the side surfaces 52 and 62), the cut-off portion 55 of the first LD 11 and the cut-off portion 65 of the second LD 12 locate the closest to each other. That is, the first LD 11 is disposed at the +X side and the second LD 12 is disposed at the −X side in FIG. 6A, which make it possible to disposed the first LD 11 closer to the second LD 12 without considering the influence of the corner portion P2 of the second LD 12.

The cut-off portion 55 uses the ditch 50. However, it is also possible to form the cut-off portion in different ways.

The second LD 12 is an LD with the second wavelength and two emission points are formed next to each other in lateral direction. Therefore, the second LD 12 need not width reduction to the thickness of the substrate (100 μm). Also, the second LD 12 has a GaAs substrate 120, to which the cleavage processing without the half dicing is possible up to the thickness twice as thick as that of the substrate (200 μm). That is, the cleavage processing is might be possible by making a small cutting mark at the cleavage position. In this case, the ditch 50 where the step shape (the cut-off portion 65) remains after the cleavage processing need not be formed.

However, the first LD 11 and the second LD 12 can be disposed more closer to each other by forming the cut-off portion 65 at least in the side surface 62 of the second LD 12 at the edge located next to the first LD 11 in such manner where the chip width near the upper surface 63 is smaller than that of the chip width near surface 64.

One example will be explained. The corner portion P2 can be cut-off by 3.52 μm in the direction of width when the inclination (offset) of the n-type GaAs substrate 120 is 10 degrees and when the depth d of the cut-off portion 65 is 20 μm (FIG. 6B). In this case, the distance between the first LD 11 and the second LD 12 is reduced by 3.52 μm compared to the case when the cut-off portion 65 is not formed.

The first LD 11 is disposed in such manner that the cut-off portion 55 locates the closest to the second LD 12 in the side surfaces of the first LD 11 and the second LD 12 facing against each other (side surfaces 52 and 62) even if the cut-off portion 65 in the second LD 12 is not formed. Although the corner portion P2, which locates the furthest away from the center C0, protrudes to the direction of width of the chip, the distance between two chips can be disposed close to each other because the first LD 11 has the cutoff portion 55.

The distance between two chips can be reduced by forming only the cut-off portion 65 in the second LD 12 without forming the cut-off portion 55 in the first LD 11.

The distance L1 between the first emission point E1 and the second emission point E2 can be reduced up to 90 μm (in addition ±20 μm, as a mounting error) in this embodiment with configuration described above. The distance L2 between the second emission point E2 and the third emission point E3 is, for example, 80 μm (in addition ±1 μm, as processing error of the photo lithography). With an improved photo lithography technology, the distance can be reduced under 90 μm. The first LD 11 and the second LD 12 can be disposed in such manner that the corner of the first LD 11 shown as a dotted line and the corner of the second LD 12 shown as a dotted line in FIG. 6B can be superimposed or touched, in the best possible case.

Since the first LD 11 and the second LD 12 can be mounted on the supporting substrate 105, the radiation of heat is better compared to the case where the first LD 11 and the second LD 12 has a layered configuration.

The first emission point E1, the second emission point E2, and the third emission point E3 are formed in the plane surface (XZ surface) that has a right angle against the main surface of the supporting substrate 105 as shown in FIG. 6C.

Each laser light emitted from the first LD 11 and the second LD 12 is parallel to the optical axis of the optical pickup device 100, which is superimposed, for example, with the second laser light (dotted arrow in FIG. 6C).

The optical axis of the laser light emitted from the central emission point (the second emission point2) among three emission points, which are disposed next to each other in lateral direction, coincides with the center of the semiconductor laser device 1 and the optical axis of the object lens 16. This embodiment allows the optical axis of the laser lights with three different wavelengths emitted from one semiconductor laser device 1 to coincide with, or to draw nearer to the optical axis of the object lens 16 without using the another means to adjust optical axis.

Figure 9:
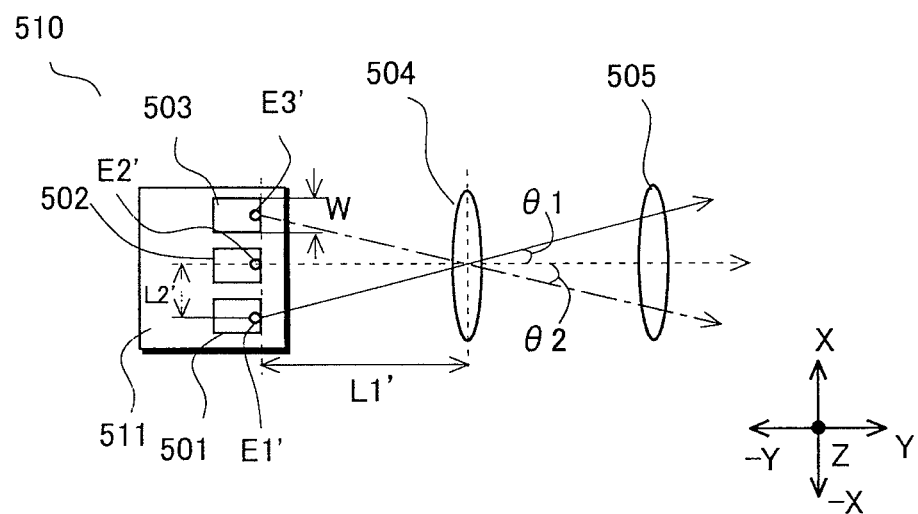
FIG. 9 is a plan view of the semiconductor laser device of the prior arts.
Figure 10:
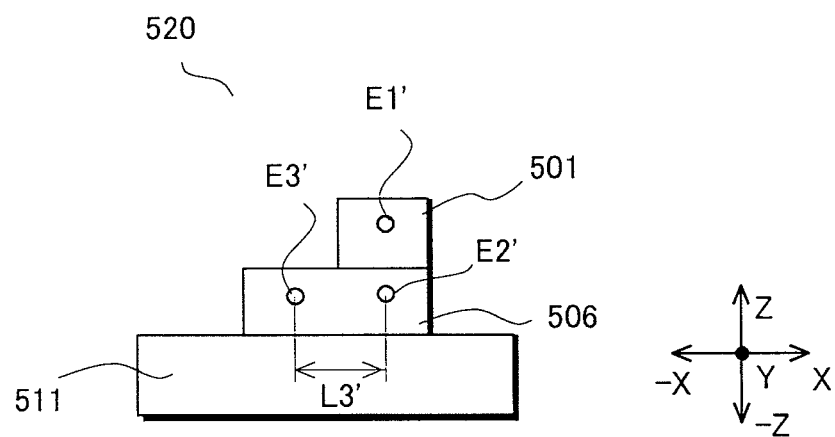
FIG. 10 is a side view of the semiconductor laser device of the prior arts.

The incline of the light emitted from the collimator 8 of the first LD 11 can be minimized (for example, the angle corresponding to the θ1 in FIG. 9 is 0.3 degrees) compared to the case shown in FIG. 9 by shortening the distance among the emission points. Then, the aberration of the object lens 16, which is caused by the incline, can be reduced to less than 0.01λ.

Three emission points are all formed through the photo lithography processing. The distances among emission points can be further reduced by making the amount of the shift from the center even bigger in such manner the first LD 11 and the second LD 12 are closest each other. However, the bigger shifting amount can also cause the following problems; first, the malfunction might occur due to light leakage or electric leakage; second, the deteriorated reliability occurs when the breakage or the stress during the separation process into individual chips reaches to the emission points; third, the deteriorated thermal property and reliability might occur because of the change in the distribution of heat and heat radiation. Therefore, the distance among the emission points should be reduced in an appropriate way by adjusting the amount of shift so that the problem listed above would not take place. However, the way to reduce the distances among the emission points is not limited to the example of this embodiment described above.

The error takes place as for the locations of the first emission point E1, the second emission point E2, and the third emission point E3 due to the mounting error (±20 μm) of the first LD 11 and the second LD 12.

The first PDIC 14a for receiving the controlling laser light of the first laser light (the first LD 11) and the second PDIC 14b for receiving the controlling light of the second or the third laser light (the second LD 12) are formed independently in the first embodiment of this invention (see FIG. 1A). Therefore the mounting errors (±20 μm) of the first emission point E1, the second emission point E2, and the third emission point E3 can be absorbed by adjusting the first PDLC 14a and the second PDIC 14b respectively.

Figure 7:
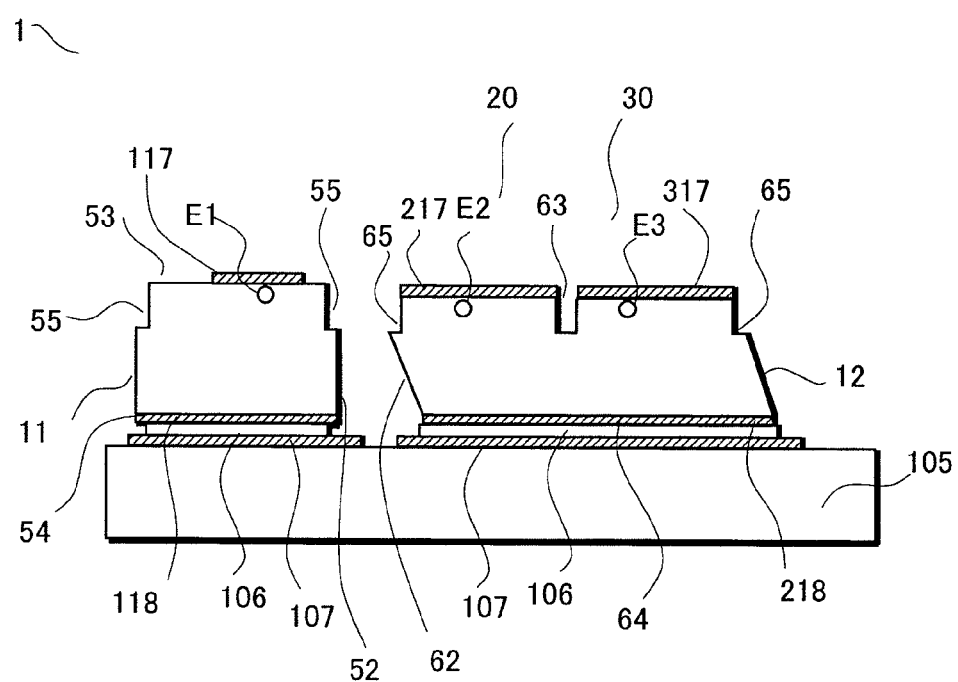
FIG. 7 is a side view of a second embodiment of the semiconductor laser device of this invention.
Figure 7:
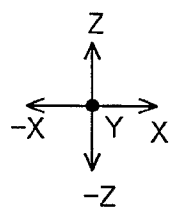

FIG. 7 shows the second embodiment of this invention. The first LD 11 and the second LD 12 of the FIGS. 5A to 5F are mounted with the junction up configuration.

The first emission point E1, the second emission point E2, and the third emission point E3 are disposed to the locations away from the supporting substrate 105 in the junction up configuration. That is, the n-type GaN substrate 110 of the first LD 11 and the n-type GaAs substrate 120 of the second LD 12 are facing against the supporting substrate 105. The conductor pattern 107 on the supporting substrate 105 and its corresponding n-side electrode 118 of the first LD 11 and the n-side electrode 218 of the second LD 12 are put together using conduction adhesive such as solder or a conduction paste.

The first LD 11 and the second LD 12 are disposed in such manner that the first LD 11 and the second LD 12 locate the closest to each other as for the main surfaces of the chips, to which the first emission point E1, the second emission n point E2, and the third emission point E3 take the closer location.

That is, the distance between the lower surface 54 of the first LD 11 and the lower surface 64 of the second LD 12 is smaller than the distance between the upper surface 53 and the upper surface 63. The first LD 11 is disposed to the opposite side (−X side) of the second LD 12 from the first embodiment (FIG. 6A) in order to reduce the distance between the first emission point E1 and the second emission point E2. The cutoff portions 55 and 65 are formed at the side surfaces 52 and 62, which are the side surfaces 52, 62 of the first LD 11 and the second LD 12 facing each other. The first LD 11 and the second LD 12 are disposed in such manner that the cutoff portions 55 and 65 locate the closest to each other. Therefore, the first LD 11 can be disposed close to the second LD 12, reducing the distance between the emission points, without an influence from the corner portion P2 of the second LD 12.

The other configurations are the same as those of the first embodiment, so the explanation about the other configurations will be omitted.

Figure 8A:
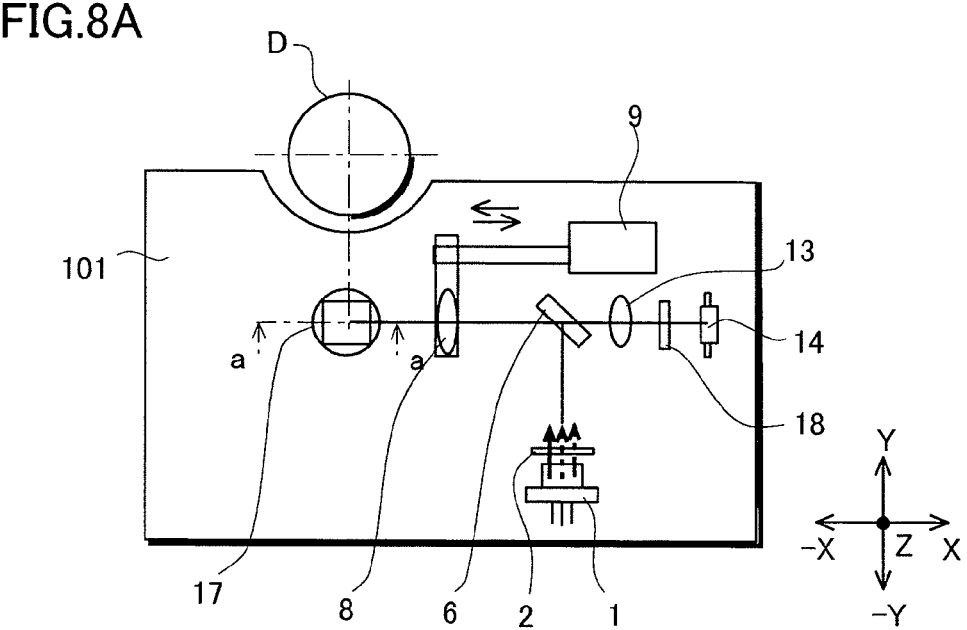
FIGS. 8A and 8B are simplified diagrams showing a third embodiment of the optical pickup device of this invention.
Figure 8B:
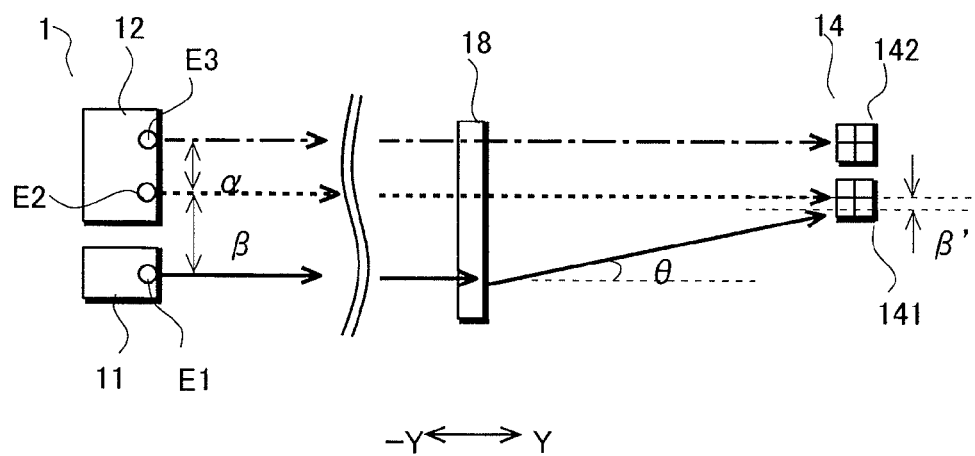

The third embodiment of this invention will be explained by referring to FIGS. 8A and 8B. The laser lights reflected by the optical disc D (the returning light) can be received by one PDIC 14. FIG. 8A is a simplified diagram showing the optical system of the optical pickup device 101 of the third embodiment. FIG. 8B shows the optical passage of each laser light entering to the PDIC 14.

The same configurations as those of the optical system of the first embodiment have the same numerical and the explanation about the configurations will be omitted.

The optical pickup device 101 has a semiconductor laser device 1, a diffraction grating 2, a semitransparent mirror 6, a collimator lens 8, a reflecting mirror 17, a quarter wavelength plate, and an object lens (not shown in the figure, see FIG. 1B), a anamorphic lens 13, a PDIC 14, and a optical axis adjusting element 18.

The semitransparent mirror 6 reflects the laser light coming from the semiconductor laser device 1 through the diffraction grating 2 to the −X direction and transmits the laser light reflected (the returning light) by the optical disc D to the +X direction.

The anamorphic lens 13 provides the astigmatism to the laser light irradiating to the PDIC 14 through the semitransparent mirror 6.

The PDIC 14 has a plurality (for example, 2) of light receiving areas (FIG. 8B). The PDIC receives each of the laser light, detects signals, and performs the focus servo and the tracking servo.

Next, the read out operation and the write in operation of the optical pickup device 101 will be explained. The process for the light to reach to the optical disc D from the semiconductor device 1 is the same as that of the first embodiment.

The returning light reflected at the signal recording layers R1, R2, or R3 of the optical disc D is emitted to the semitransparent mirror 6 through the object lens (not shown), the quarter wavelength plate (not shown), the reflecting mirror 17, and the collimator lens 18.

Each laser light, the returning light, is converted from a circularly polarized light to a linearly polarized light when it is transmitted through the quarter wavelength plate. Therefore, the polarization angle of the returning light rotates 90 degree, becoming a controlling laser light after passing through the semitransparent mirror 6 that has polarization dependency. A semitransparent mirror 6 without polarization dependency can be also used. In this case, the returning laser light entering the semitransparent mirror 6 is reflected about 50%, which becomes about 50% of the controlling laser light when it passes through the semitransparent mirror 6.

The controlling laser lights with three-wavelengths irradiate at the anamorphic lens 13 after passing through the semi-transparent mirror 6. The astigmatism for focus servo is provided to the controlling laser lights, which, then, reaches to the PDIC 14 through the optical axis correction element 18.

The optical axis correction element 18 is formed to change the traveling direction of the laser light with a certain wavelength and it is disposed, for example, between the anamorphic lens 13 and the PDIC 14 as shown in FIG. 8B.

The optical axis correction element 18 diffracts the first laser light with the shortest wavelength (shown as the solid line in the figure), giving a certain incline to the traveling direction of the first laser light. The optical axis correction element 18 let the second laser light (shown as the dotted line in the figure) and the third laser light (shown as the dashed line in the figure), both of which have longer wavelength than the first laser light, pass through it without diffracting them and changing their traveling direction. That is, the optical axis correction element 18 diffracts the first laser light traveling in parallel to the optical axis of the optical pickup device 101, drawing the traveling pass of the first laser light closer to that of the second laser light by giving it a certain angle ($\theta°$). Each of the laser lights emitted from the first LD 11 and the second LD 12 has a traveling pass parallel to the optical axis of the optical pickup device 101. Also, the traveling pass of the second laser light, for example, is superimposed with the optical axis of the optical pickup device 101.

The PDIC 14 has 2 light receiving areas (a first light receiving area 141 and a second light receiving area 142).

Although the error takes place as for the locations of the first emission point E1, the second emission point E2, and the third emission point E3 due to the mounting error of the first LD 11 and the second LD 12, the error can be absorbed by the optical axis correction element 18 in the third embodiment of this invention. Therefore, it is possible for one PDLC 14 to receive the lights with three different wavelengths.

For example, the returning light of the first laser light emitted from the first emission point E1 is diffracted at the optical axis correction element 18 by a certain amount of degree ($\theta°$), and then irradiates the first light receiving area 141. The returning light of the second laser light emitted from the second emission point E2 passes through the optical axis correction element 18, and then irradiates the first light receiving area 141.

That is, the first laser light and second laser light can be drown nearer when they irradiate the PDIC 14 through the optical axis correction element 18. One light receiving area (the first light receiving area 141) can detect two laser lights with two wavelengths.

The returning light of the third laser light emitted from the third emission point E3 passes through the optical axis correction element 18, and then irradiates the second light receiving area 142.

The first laser light and the second laser light may not be able to be coinciding the more enough complete or more necessary even though can be adjacent due to the mounting error of the first LD 11 and the second LD 12.

For example, the focusing point of the returning light of the first laser light at the first light receiving area 141 may be shifted by $\beta'$ even after it is diffracted by $\theta°$ due to the mounting error of the first LD 11 and the second LD 12 when the distance between the second emission point E2 and the third emission point E3 is $\alpha$ and the distance between the first emission point E1 and the second emission point E2 is $\beta$.

In this case, $\beta'$ can be altered by moving the optical axis correction element 18 in ±Y direction without moving the PDIC 14, absorbing the error of the first emission point E1 and the second emission point E2, for example.

The optical system that can direct the lights with three different wavelengths emitted from the semiconductor laser device 1 to the optical disc D and that can direct laser light reflected at the optical disc D to one PDIC 14 can be built in the optical pickup device 101 of this embodiment.

The LD with a single wave length and the monolithic LD with two wavelengths are integrated as one package in the semiconductor laser device, where two LDs are disposed in lateral on the supporting substrate in this embodiment. The emission points of each LD are formed at the locations shifted from the center of each chip for moving the emission point of each LD closer to the center of the semiconductor laser device.

When two LD are disposed in lateral, at least one of the LDs has the cutoff portion on the side surface which is facing to the other LD for avoiding the influence from the corner portion protruding from the monolithic two-wavelength LD with a inclined side surface to the single-wavelength LD. And two of the chips are adjacent and arranged so that the cutoff portion of the other chip may become near to another chip.

Therefore, the distances among the three emission points can be reduced when two LDs are formed on the supporting substrate 105 in lateral.

Furthermore, the optical axis of the laser light coming from the LD that locates in the center of the semiconductor laser device coincides with the optical axis of the object lens, collecting the laser lights with three different wavelengths by directing them to single object lens, in this embodiment. Therefore, the aberration due to the shift of the optical axis can be reduced without forming another optical axis correcting means.

The emission point E2 locates closer to the first LD 11 in the second LD 12 in this embodiment. It is also possible to form the second LD in such manner that the third emission point E3 locates closer to the first LD 11.

Additionally, the emission point E1 can be near the center of the chip, if the distances among emission points of the first LD 11 and the second LD 12 can be reduced enough by forming the cutoff portions 55 and 56.

Also, it is not necessary to form the cutoff portions 55 or 56 if the distances among the emission points are reduced enough by shifting the first emission point E1, the second emission point E2, and the third emission point E3 toward the center of the semiconductor laser device 1.

The following improvement can be obtained according to the embodiment of this invention.

First, the first LD (for BD) with a reduced chip size and the second LD (for DVD and CD, monolithic) are disposed (in lateral) on a supporting substrate for the package. The emission point of the first LD is disposed in such manner that it is shifted from the center of the LD chip, so that the emission point of the first LD locates closer to the second LD, making the emission points of the lights with three wavelengths closer to each other.

Secondly, the emission points of the lights with three wavelengths can be even closer by forming, at least, one of the emission points of the LD for DVD or the LD for CD in the second LD at the location shifted away from the center of the second LD chip toward the first LD.

The side surface of the second LD (for DVD/CD) extending to the resonating direction of the laser light inclines and the cross-sectional surface crossing by a right angle against the laser light emission will be a parallelogram. It is necessary to take an enough space between the furthest corner of the parallelogram from the center of the chip and the neighboring first LD to avoid the touching of the two.

When both the first LD and the second LD are disposed on the supporting substrate in such manner that a p-type clad layer becomes an lower layer (the p-type clad layer is disposed opposite the supporting substrate), the first LD and the second LD should be disposed adjacent to each other to make the distance between them is minimum, so that the touching of the furthest corners of the chips can be avoided.

And thirdly, the first LD (for BD) with a reduced chip size and the monolithic second LD are disposed (in lateral) on a supporting substrate for the package, where two LDs can be disposed close to each other by forming a cut-off portion at the side surface of the first LD facing to the second LD. Therefore the emission points of the lights with three wavelengths closer to each other.

The side surface of the second LD extending in the resonating direction of laser light is inclined. Therefore, the furthest corner from the center of the chip of the second LD takes the closest location to the first LD when the second LD is disposed in lateral to the first LD. The reduction of the distance between the emission points of first and second LDs is difficult when the second LD has a corner portion.

However, it is possible to reduce the distance between the emission points of the first and second LDs by disposing the first and second LDs closer to each other through the formation of the cut-off portion at the side surface of the first LD facing against the second LD.

Furthermore, the first and second LDs can be disposed even closer when the protruding portion is cut-off at the side surface of the second LD facing against the first LD.

Fourthly, the semiconductor laser device of this invention enables one object lens to accommodate the three-wavelength LD without using a special device or special configuration for correcting the shift of the optical axes of the lights with three wavelengths.

That is, the central emission point among the three emission points coincides with the center of the semiconductor laser device and the optical axis of the object lens. Therefore, the laser lights with three wavelengths emitted from one semiconductor laser device can be either coincided with or closer to the optical axis of the object lens without forming other means to adjust the optical axes of the lights with three wavelengths.

Thus, the optical pickup device that can accommodate three wavelengths with simple configuration and lower cost can be obtained by reducing the number of parts used in the device in this invention.

What is claimed is:

1. An optical pickup device comprising:
   a first semiconductor laser element comprising a first emission point shifted from a center of the first semiconductor laser element, and a first side surface located closer to the first emission point than another side surface;
   a monolithic two-wavelength semiconductor laser element comprising a second side surface facing against and adjacent to the first side surface, and a second emission point and a third emission point with the second emission point being closer to the first side surface than the third emission point; and
   a supporting substrate on which the first semiconductor laser element and the monolithic two-wavelength semiconductor laser element are disposed in a junction down configuration;
   wherein the second side surface of the monolithic two-wavelength semiconductor laser element inclines in such a manner as to have a larger distance between the second side surface and the first side surface as moving away from the supporting substrate, a corner area of the second side surface located adjacent to the supporting substrate is defined by a cut-off from a resonator edge surface of the monolithic two-wavelength semiconductor laser element through another edge surface opposite from the resonator edge surface, and laser light irradiating from the second emission point has a same optical axis as an actual optical axis of the optical pick up device.

2. The optical pickup device of claim 1, wherein blue-violet laser light is emitted from the first emission point and red laser light is emitted from the second emission point.

3. The optical pickup device of claim 1, wherein the resonator edge surface is a side surface of the monolithic two-wavelength semiconductor laser element and is a parallelogram, with a set of two corners diagonally facing each other having an obtuse angle and another set of two corners diagonally facing each other having an acute angle.

4. The optical pickup device of claim 3, wherein a corner area of the first side surface located adjacent to the supporting substrate is defined by a cut-off from a resonator edge surface of the first laser semiconductor element through another edge surface of the first laser semiconductor element opposite from the resonator edge surface of the first laser semiconductor element.

5. The optical pickup device of claim 4, wherein a distance between the first emission point and the second emission point is less than 90μm, and the shortest possible distance is obtained when the corners of the first side surface and the second side surface are superimposed each other if the corners have not been cut off.

6. An optical pickup device comprising:
   a semiconductor laser device, a diffraction lattice for diffracting laser light from the semiconductor laser device, a half mirror for reflecting the diffracted laser light and transmitting a returning light reflected by an optical disc, a collimator lens for converting the laser light reflected by the half mirror into a parallel light, a vertical orientation mirror for reflecting the laser light transmitted by the collimator lens, an object lens for focusing the laser light reflected by the vertical orientation mirror at a signal recording layer of the optical disc, a dichroic mirror for reflecting first laser light and for transmitting second laser light, the first laser light and the second laser light each being returning light reflected by the signal recording layer and passing through the object lens, the vertical orientation mirror, the collimator, and the half mirror so as to enter a first photo diode for detecting the first laser light and a second photo diode for detecting the second-or the third, respectively;
   wherein the semiconductor laser device comprises a first semiconductor laser element comprising a first emission point shifted from a center of the first semiconductor laser element, and a first side surface located closer to the first emission point than another side surface; a monolithic two-wavelength semiconductor laser element comprising a second side surface facing against and adjacent to the first side surface, and a second emission point and a third emission point with the second emission point being closer to the first side surface than the third emission point; and a supporting substrate on which the first semiconductor laser element and the monolithic two-wavelength semiconductor laser element are disposed in a junction down configuration; the second side surface of the monolithic two-wavelength semiconductor laser element inclining in such a manner as to have a larger distance between the second side surface and the first side surface as moving away from the supporting substrate, a corner area of the second side surface located adjacent to the supporting substrate is defined by a cut-off from a resonator edge surface of the monolithic two-wavelength semiconductor laser element through another edge surface opposite from the resonator edge surface, and the second laser light is emitted from the second emission point of the monolithic two-wavelength semiconductor laser element and has a same optical axis as an actual optical axis of the object lens.

7. The optical pickup device of claim 6, wherein a corner area of the first side surface located adjacent to the supporting substrate is defined by a cut-off from a resonator edge surface of the first semiconductor laser element through another edge surface opposite from the resonator edge surface of the first laser element.

* * * * *